(12) United States Patent
Keller et al.

(10) Patent No.: US 10,315,595 B2
(45) Date of Patent: Jun. 11, 2019

(54) FRONT END MODULE

(71) Applicant: Dr. Ing. h.c. F. Porsche Aktiengesellschaft, Stuttgart (DE)

(72) Inventors: Markus Keller, Leonberg (DE); Frank Burbulla, Leonberg (DE); Herbert Klamser, Korntal-Muenchingen (DE); Thomas Ruckstuhl, Filderstadt (DE); Franz-Rudolf Wierschem, Weissach (DE); Xuan Li, Ditzingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 296 days.

(21) Appl. No.: 15/210,946

(22) Filed: Jul. 15, 2016

(65) Prior Publication Data

US 2017/0028950 A1 Feb. 2, 2017

(30) Foreign Application Priority Data

Jul. 30, 2015 (DE) .................. 10 2015 112 506

(51) Int. Cl.
*B60R 19/00* (2006.01)
*B60R 19/02* (2006.01)
(Continued)

(52) U.S. Cl.
CPC .............. *B60R 19/00* (2013.01); *B60K 11/06* (2013.01); *B60K 13/02* (2013.01); *B60R 19/02* (2013.01);
(Continued)

(58) Field of Classification Search
CPC ......... B60R 19/00; B60R 19/02; B60R 19/36; B60R 19/52; B60R 2019/002;
(Continued)

(56) References Cited

U.S. PATENT DOCUMENTS 2,521,841 A * 9/1950 Forrester ................... F24F 6/04
261/153
3,926,462 A * 12/1975 Burns ..................... B60R 19/18
293/1
(Continued)

FOREIGN PATENT DOCUMENTS

DE 19602186 C1 5/1997
DE 102006041101 A1 10/2007
(Continued)

*Primary Examiner* — Barry Gooden, Jr.
(74) *Attorney, Agent, or Firm* — Leydig, Voit & Mayer, Ltd.

(57) ABSTRACT

A front end module for covering a front of a front vehicle part of a motor vehicle includes a crossmember that is connectable to longitudinal carriers of a motor vehicle frame so as to absorb loads of a bumper. An upper frame element is connected to the crossmember for supporting an engine hood. A receiving region for receiving a radiator grill is disposed between the crossmember and the upper frame element. Fastening elements disposed on the crossmember and/or the upper frame element are configured to fasten an intercooler for cooling charge air of a turbocharger, with respect to the driving direction, in front of a wheel arch that receives a front wheel. A crash structure is connected to the fastening elements for absorbing impact energy by way of plastic deformation and covers a majority of the front wheel in an installed state of the front end module.

17 Claims, 3 Drawing Sheets

(51) Int. Cl.
  *B60K 11/06* (2006.01)
  *B62D 21/15* (2006.01)
  *B60R 19/36* (2006.01)
  *B60K 13/02* (2006.01)

(52) U.S. Cl.
  CPC ............ *B60R 19/36* (2013.01); *B62D 21/152* (2013.01); *B60R 2019/002* (2013.01)

(58) Field of Classification Search
  CPC ... B60R 2019/527; B60K 11/06; B60K 13/02; B62D 21/15; B62D 21/152; B62D 21/155
  See application file for complete search history.

(56) References Cited

U.S. PATENT DOCUMENTS

| | | | | |
|---|---|---|---|---|
| 3,926,463 A * | 12/1975 | Landwehr | ............... | B60R 19/18 188/268 |
| 4,424,996 A * | 1/1984 | Yoshiyuki | ............... | B60K 11/04 180/68.6 |
| 5,746,419 A * | 5/1998 | McFadden | ............... | B60R 19/18 188/377 |
| 5,915,490 A | 6/1999 | Wuerfel | | |
| 6,237,990 B1 * | 5/2001 | Barbier | ................ | B62D 25/082 296/187.09 |
| 8,118,351 B2 * | 2/2012 | Gonin | .................... | B60R 19/12 296/187.09 |
| 8,191,959 B2 * | 6/2012 | Ritz | .................... | B62D 25/084 296/187.09 |
| 8,267,446 B2 * | 9/2012 | Gonin | .................... | B60R 19/12 293/120 |
| 8,336,933 B2 * | 12/2012 | Nagwanshi | ............. | B60R 19/34 188/371 |
| 2003/0085592 A1 * | 5/2003 | Seksaria | .................. | B60K 5/12 296/187.09 |
| 2003/0141712 A1 * | 7/2003 | Miyasaka | ................ | B60R 19/00 280/784 |
| 2004/0124643 A1 * | 7/2004 | Matsumoto | ............. | B60R 19/12 293/115 |
| 2004/0168451 A1 * | 9/2004 | Bagley | .................... | F25B 41/04 62/196.4 |
| 2004/0188155 A1 * | 9/2004 | Fujieda | .................. | B60K 11/04 180/68.4 |
| 2006/0186701 A1 * | 8/2006 | Browne | ................. | B62D 21/15 296/187.02 |
| 2008/0067838 A1 * | 3/2008 | Nakamae | ............. | B62D 21/152 296/203.02 |
| 2009/0159237 A1 * | 6/2009 | Kuwabara | ................. | B60K 11/04 165/41 |
| 2009/0266508 A1 | 10/2009 | Furuta | | |
| 2010/0213742 A1 | 8/2010 | Ritz | | |
| 2010/0253102 A1 * | 10/2010 | Riviere | .................... | B60R 19/12 293/121 |
| 2011/0115241 A1 * | 5/2011 | Gonin | ..................... | B60R 19/03 293/120 |
| 2011/0148151 A1 * | 6/2011 | Abe | ....................... | B60R 19/34 296/203.02 |
| 2011/0221213 A1 * | 9/2011 | Riviere | ................ | B62D 21/152 293/132 |
| 2011/0272954 A1 * | 11/2011 | Gonin | ...................... | B60J 5/101 293/120 |
| 2012/0086237 A1 * | 4/2012 | Raulf | ...................... | B60R 19/18 296/193.09 |
| 2012/0112479 A1 * | 5/2012 | Nagwanshi | ............. | B60R 19/34 293/133 |
| 2012/0248819 A1 * | 10/2012 | Okamura | ................. | B60R 19/12 296/187.1 |
| 2012/0313398 A1 * | 12/2012 | Shin | ...................... | B62D 21/152 296/187.1 |
| 2013/0134742 A1 * | 5/2013 | Mildner | ............... | B62D 25/088 296/203.02 |
| 2013/0154308 A1 * | 6/2013 | Sotoyama | ............ | B62D 21/152 296/187.08 |
| 2014/0062131 A1 * | 3/2014 | Green | .................... | B62D 27/06 296/187.09 |
| 2014/0159423 A1 * | 6/2014 | Chang | ..................... | B62D 25/16 296/187.09 |
| 2014/0186222 A1 * | 7/2014 | Shinoda | ............. | B01D 53/8675 422/120 |
| 2015/0076847 A1 * | 3/2015 | Mori | ....................... | B60R 19/34 293/154 |
| 2015/0166109 A1 * | 6/2015 | Eberle | ...................... | B60K 1/04 180/232 |
| 2015/0343893 A1 * | 12/2015 | Nam | .................... | B60K 11/085 701/49 |
| 2015/0344079 A1 * | 12/2015 | Stojkovic | ............. | B62D 27/023 296/187.09 |
| 2015/0360632 A1 * | 12/2015 | Nishida | ................ | B62D 21/152 293/133 |
| 2015/0360633 A1 * | 12/2015 | Nishida | ................ | B62D 21/152 293/133 |
| 2016/0016617 A1 * | 1/2016 | Wolf | ...................... | B62D 37/02 296/208 |
| 2016/0061150 A1 * | 3/2016 | Yang | ..................... | B60K 13/02 123/568.12 |
| 2016/0167544 A1 * | 6/2016 | Barbat | ..................... | B60K 1/04 180/68.5 |

FOREIGN PATENT DOCUMENTS

| | | |
|---|---|---|
| DE | 102009031311 A1 | 1/2010 |
| DE | 102009009882 A1 | 8/2010 |
| WO | WO 2014173476 A1 | 10/2014 |
| WO | WO 2015140428 A1 | 9/2015 |

\* cited by examiner

FRONT END MODULE

CROSS-REFERENCE TO PRIOR APPLICATION

Priority is claimed to German Patent Application No. DE 10 2015 112 506.4, filed on Jul. 30, 2015, the entire disclosure of which is hereby incorporated by reference herein.

FIELD

The invention relates to a front end module which can form a front cover of a front vehicle part of a motor vehicle.

BACKGROUND

WO 2014/173 476 A1 has disclosed a front vehicle part of a motor vehicle, in which a wedge element is provided in a corner region which points away from the vehicle center line between a bumper and a crash box which is provided between the bumper and the longitudinal carrier of a motor vehicle frame, in order for it to be possible to support loads which even occur laterally outside the longitudinal carrier on the bumper via a defined force path on the longitudinal carrier.

SUMMARY

In an embodiment, the present invention provides a front end module for covering a front of a front vehicle part of a motor vehicle. A crossmember is connectable to longitudinal carriers of a motor vehicle frame so as to absorb loads of a bumper. An upper frame element is connected to the crossmember for supporting an engine hood. A receiving region for receiving a radiator grill is disposed between the crossmember and the upper frame element. Fastening elements disposed on at least one of the crossmember or the upper frame element are configured to fasten an intercooler for cooling charge air of a turbocharger, with respect to the driving direction, in front of a wheel arch that receives a front wheel. A crash structure is connected to the fastening elements for absorbing impact energy by way of plastic deformation and covers a majority of the front wheel arranged in the wheel arch in an installed state of the front end module.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
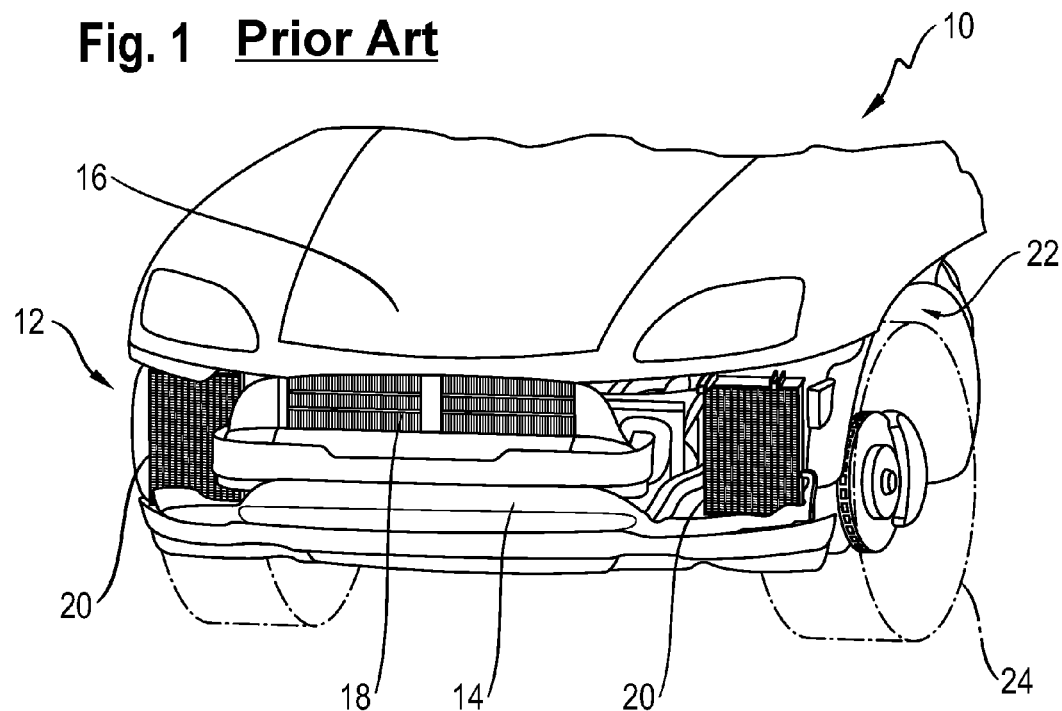
FIG. 1 shows a diagrammatic perspective view of a previously known front vehicle part of a motor vehicle.

For improving the crash behavior of a motor vehicle, the invention, in an embodiment, indicates measures which make a satisfactory crash behavior of a motor vehicle possible. In particular, an improved steering capability of a front wheel is made possible in the case of an impact with an overlap of a front lateral structure of the motor vehicle.

According to an embodiment of the invention, a front end module is provided for covering the front of a front vehicle part of a motor vehicle, having a crossmember which can be connected to longitudinal carriers of a motor vehicle frame for absorbing loads of a bumper, an upper frame element which is connected to the crossmember for supporting an engine hood, a receiving region for receiving a radiator grill being configured between the crossmember and the upper frame element, the crossmember and/or the upper frame element having fastening elements for fastening a lateral heat exchanger which is arranged in front of a wheel arch for receiving a front wheel in the driving direction and is configured, in particular, as an intercooler for cooling charge air of a turbocharger, and a crash structure which is connected to the fastening elements for absorbing impact energy by way of plastic deformation, the crash structure being configured as viewed counter to the driving direction to cover the majority of the front wheel which is arranged in the wheel arch in the installed state of the front end module.

The front end module can be provided for different embodiments of a defined motor vehicle type. For example, a motor vehicle engine with a turbocharger or a motor vehicle engine without a turbocharger can be provided for said motor vehicle type, and/or can be equipped with a central or lateral intercooler and/or additional water radiator, it being possible for the same front end module to be used for said types of motorizations of the motor vehicle. In the case where the front end module is to be used for a motor vehicle type with a turbocharger and, in particular, with a lateral intercooler, the front end module has the fastening elements which are required to this end, in order for it to be possible to connect the lateral intercooler for the turbocharger or a lateral heat exchanger which is comparable with the intercooler to the front end module and/or a motor vehicle body of the motor vehicle. In the case where the front end module is to be used for a motor vehicle type without a turbocharger and/or with a central intercooler, the lateral intercooler is dispensed with, with the result that the fastening elements which are provided for the lateral intercooler are not required in principle.

Since free installation space is available as a result of the lateral heat exchanger, in particular the lateral intercooler, being dispensed with, said installation space which is actually provided for the lateral heat exchanger or a component of comparable dimensions and is now free can be utilized for the crash structure which at the same time can be fastened via the fastening elements which are actually provided for the intercooler and are now not utilized. The crash structure can be optimized for absorbing impact energy and can absorb a greater amount of impact energy which occurs during a crash, at least in comparison with an intercooler. To this end, the crash structure can have a plurality of plastically deformable components which can absorb the impact energy by way of deformation work. Here, the finding is utilized at the same time that the intercooler or another lateral heat exchanger is usually arranged in front of the wheel arch of the motor vehicle and the crash structure which replaces the intercooler is likewise positioned in front of the wheel arch as a result. As a result, the crash structure is positioned in a region which, in the case of a frontal crash with a low overlap of the colliding crash partners ("small overlap crash"), can advantageously be utilized with regard to a defined transmission of force and energy absorption and an influence for the targeted positioning of components, in particular of the front wheel. Therefore, the crash structure makes it possible even in a crash to rotate the front wheel into an advantageous wheel position, in which the vehicle body structure behind the front wheel is loaded favorably in the case of a small overlap crash. As a result of the crash structure which is provided instead of the lateral heat exchanger which would otherwise be provided, a motor vehicle with a satisfactory crash behavior even in the case of a pronounced small overlap crash is made possible.

In particular, in the case of a wheel position of the front wheel for driving straight ahead, the crash structure is configured to cover an axial width b of the front wheel with a proportion of 95%≤b≤100%, in particular 96%≤b≤99% and preferably 97%≤b≤98%. As a result, the front wheel is covered sufficiently by the crash structure, with the result that, in the case of a small overlap crash, the crash partner cannot press the wheel arch into the front wheel so easily and block the front wheel.

The crash structure is preferably configured to cover a vertical height h of the front wheel with a proportion of 50%≤b≤90%, in particular 60%≤b≤80% and preferably 65%≤b≤75%. As a result, the crash structure can cover and protect the front wheel over a comparatively great height, a sufficient clearance remaining at the same time between the crash structure and the underlying surface. The crash structure preferably extends downward as far as a level of an undertray of the motor vehicle body and upward as far as an upper edge of the front wheel, preferably as far as an upper edge of the opening space which is formed for the front wheel by way of the wheel arch.

In particular, the crash structure has a load-bearing element which is configured, in particular, as a load-bearing frame for fastening a motor vehicle assembly, in particular a filter, pump and/or container in a load-bearing manner. As a result, the load-bearing element of the crash structure can additionally be utilized as a fastening location for the corresponding motor vehicle assembly and, for example, can dissipate the weight forces of the motor vehicle assembly to the motor vehicle frame. The crash structure can serve, for example, as a bracket and/or receiving structure for the motor vehicle assembly.

In the installed state of the front end module, the crash structure is particularly preferably arranged for a large part, in particular completely, in a direction laterally away from a vehicle center line to an adjacent longitudinal carrier of the motor vehicle frame. As a result, the crash structure is arranged in a region which lies laterally outside a load-bearing frame of the motor vehicle, which load-bearing frame is formed by longitudinal carriers and crossmembers. As a result, the crash structure can receive and absorb and/or dissipate impact forces outside the load-bearing frame. In the case of a small overlap crash, the impact forces can be conducted past the passenger compartment above the front wheel in a targeted manner via the crash structure. Here, the crash structure actively positions the front wheel in such a way that the front wheel loads the lateral guide structure in an impact phase before the front wheel is deflected.

In particular, an intercooler, in particular for cooling charge air of a turbocharger, is provided between the crash structure and the receiving region for receiving a radiator grill, the intercooler being arranged, in particular in the installed state of the front end module, in the lateral direction between an adjacent longitudinal carrier and a vehicle center line, preferably between the adjacent longitudinal carrier and the receiving region. As a result, the front end module can also be used for motor vehicles with a turbocharger, in this case the intercooler not being positioned in front of the wheel arch, but rather offset inward in the direction of the vehicle center line. As a result, the intercooler can be positioned, in particular, in a lateral extension of the radiator grill which can be used, for example, for cooling the motor vehicle engine.

In particular, the crash structure has a honeycomb structure and/or a foam structure and/or crash boxes. As a result, in the case of a small overlap crash, the crash structure can absorb impact energy by way of deformations. Here, the crash structure is preferably designed in such a way that the crash structure initiates a steering movement in the front axle in the first impact phase and deforms virtually completely as the impact phase proceeds. At least part of the honeycombs of the honeycomb structure are preferably oriented obliquely with respect to the vehicle direction. As a result, the force level and the energy absorption can be adapted in an optimum manner in conjunction with the geometric stiffness. The foam structure can be formed, for example, by way of a foam of relatively high density, in particular foamed metal. The material which surrounds the pores in the foam structure can be deformed in the case of a crash and can absorb impact energy by way of the deformation work.

In a part region which points away from a vehicle center line, the crash structure preferably has a greater thickness in the driving direction than outside the part region, it being true, in particular, for the ratio of the maximum thickness $d_{max}$ of the part region to a thickness $d_m$ of the crash structure which is averaged over the surface region of the crash structure which points in the driving direction that $1.1 \leq d_{max}/d_m \leq 4.0$, preferably $1.5 \leq d_{max}/d_m \leq 3.0$ and particularly preferably $2.0 \leq d_{max}/d_m \leq 2.5$. By way of the part region, the crash structure can have a region, in which a particularly large amount of deformation is possible and/or particularly pronounced stiffening is provided even in comparison with the remaining crash structure.

The crash structure particularly preferably has at least one mounting means for fastening both to the crossmember and/or the upper frame element and to a motor vehicle body. The mounting means can be configured, for example, as a through opening, through which a fastening means, for example a screw or a rivet, can be guided, in order to connect the crossmember and/or the upper frame element of the front end module to the motor vehicle body with the aid of the associated fastening element and in the process to clamp the crash structure between the motor vehicle body and the crossmember and/or the upper frame element. As a result, the crash structure can be mounted in the same way as the intercooler which would otherwise be provided, with the result that substantially the same mounting steps as in the case of the installation of an intercooler instead of the crash structure arise during the mounting of the front end module.

In particular, the crash structure has a cutout which points toward the vehicle center line for the insertion of a central heat exchanger, in particular an intercooler for cooling charge air of a turbocharger. Instead of the central heat exchanger, another component can also be inserted into the cutout. The crash structure can engage around the intercooler, for example, in a substantially C-shaped manner and as a result likewise protect it in the case of a small overlap crash. The parts of the crash structure which project toward the vehicle center line can preferably be connected to one another via a substantially vertically running strut, which results in a frame, into which the intercooler can be inserted. In particular, the plug-in depth of the intercooler can be limited by way of the strut, with the result that the mounting is simplified.

Furthermore, the invention relates to a front vehicle part for a motor vehicle having a left-hand longitudinal carrier which forms part of a motor vehicle frame, a right-hand longitudinal carrier which forms part of a motor vehicle frame, a front end module which can be configured and developed as described in the preceding text, the crossmember of the front end module being connected to the left-hand longitudinal carrier and the right-hand longitudinal carrier, a left-hand wheel arch which forms part of the motor vehicle body, a left-hand front wheel which is arranged in the left-hand wheel arch, a right-hand wheel arch which forms part of the motor vehicle body, and a right-hand front wheel which is arranged in the right-hand wheel arch, a crash structure of the front end module being positioned in front of the left-hand front wheel in the driving direction and/or a crash structure of the front end module being positioned in front of the right-hand front wheel in the driving direction. A motor vehicle having a satisfactory crash behavior even in the case of a pronounced small overlap crash is made possible by way of the crash structure which is provided instead of the lateral heat exchanger which would otherwise be provided.

In particular, the crash structure is fastened, in particular directly, to the left-hand wheel arch or to the right-hand wheel arch. As a result, additional stiffening can be achieved in the region of the wheel arch. The risk of the wheel arch being pressed in in the case of a crash and damaging the front wheel can be reduced as a result.

In the following text, the invention will be explained by way of example with reference to the appended drawings using preferred exemplary embodiments, it being possible for the features which are described in the following text to represent an aspect of the invention both in each case individually and in combination.

Figure 2:
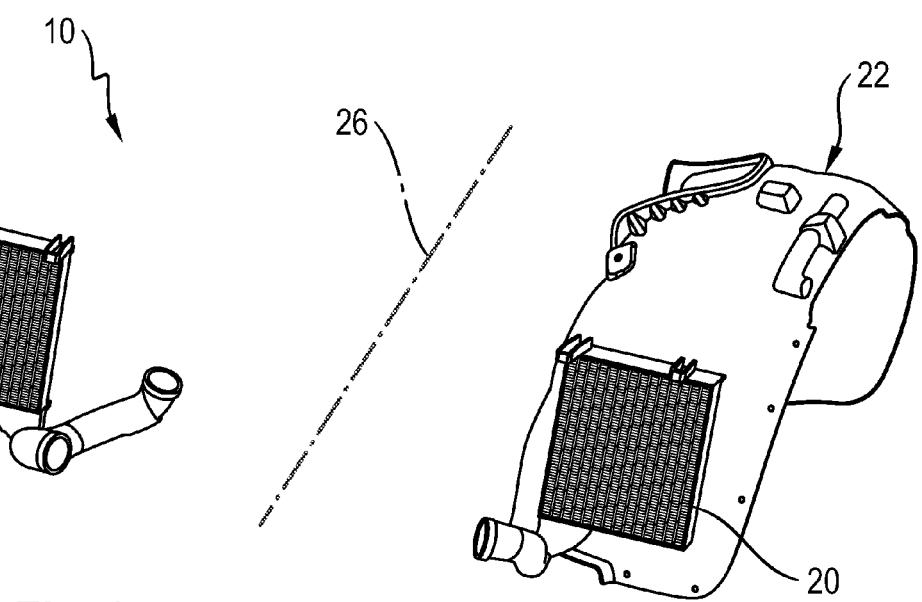
FIG. 2 shows a diagrammatic perspective simplified view of part of the front vehicle part from FIG. 1.

The front vehicle part 10 which is shown in FIG. 1 has a front end module 12 with a crossmember 14. The crossmember 14 can support a bumper, for example via crash boxes which are connected in between, or can itself act as a bumper. The crossmember 14 is connected to longitudinal carriers and can form part of a motor vehicle frame. In addition, the front end module 12 has an upper frame element which is covered by an engine hood 16 in FIG. 1. A radiator grill 18 is inserted between the crossmember 14 and the upper frame element. In the exemplary embodiment which is shown, an intercooler 20 which is shown separately in FIG. 2 is provided additionally in each case on the left-hand side and on the right-hand side between the crossmember 14 and the upper frame element, which intercoolers 20 are positioned in each case in the driving direction in front of a front wheel 24 which is arranged in a wheel arch 22. Here, the respective intercooler 20 is positioned laterally outside the motor vehicle frame, that is to say the intercooler 20 is arranged on a side of the longitudinal carrier of the motor vehicle frame which is connected to the crossmember 14, which side points away from a vehicle center line 26.

Figure 3:
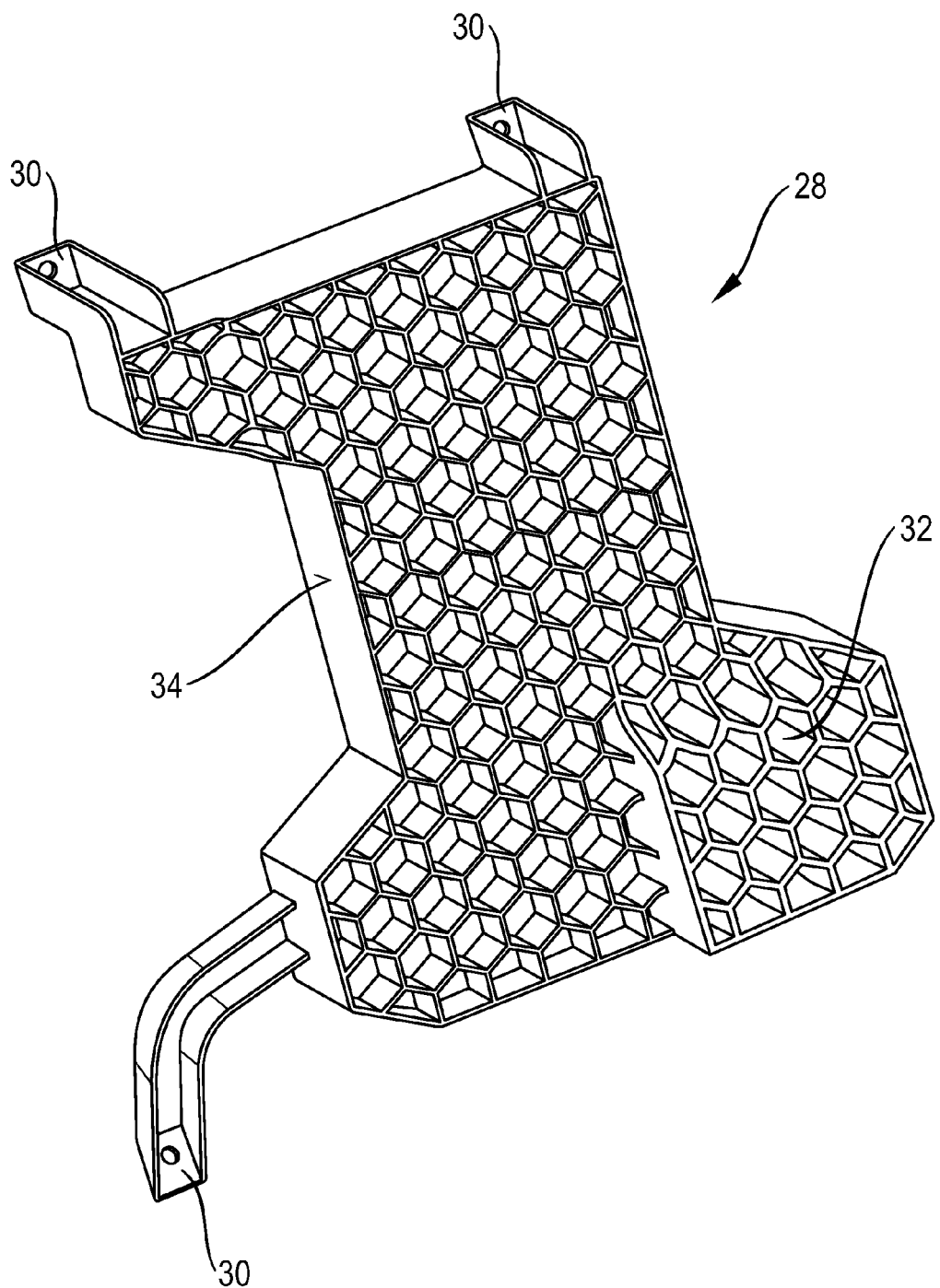
FIG. 3 shows a diagrammatic perspective view of a first embodiment of a crash structure according to the invention for an improvement of the front vehicle part from FIG. 1.

For example, the left-hand intercooler 20 can be replaced by a crash structure 28 which is shown in FIG. 3. Here, the crash structure 28 can take up, for example, from 80% to 100% of the installation space of the intercooler 20 and can be fastened via the same fastening elements of the crossmember 14 and/or the upper frame element which are provided for the intercooler 20. To this end, the crash structure 28 can preferably have identically formed mounting means 30 at identical locations to the intercooler 20, via which mounting means 30 the crash structure 28 can be installed. At its end which projects laterally away from the vehicle center line 26, the crash structure 28 has a part region 32 which has a greater thickness and a greater deformation capability in comparison with the remaining crash structure 28. The crash structure 28 can have a, for example, substantially C-shaped cutout 34 toward the vehicle center line 26, into which cutout 34, for example, an intercooler 20 which is positioned between the radiator grill 18 and the crash structure 28 can be inserted at least partially.

Figure 4:
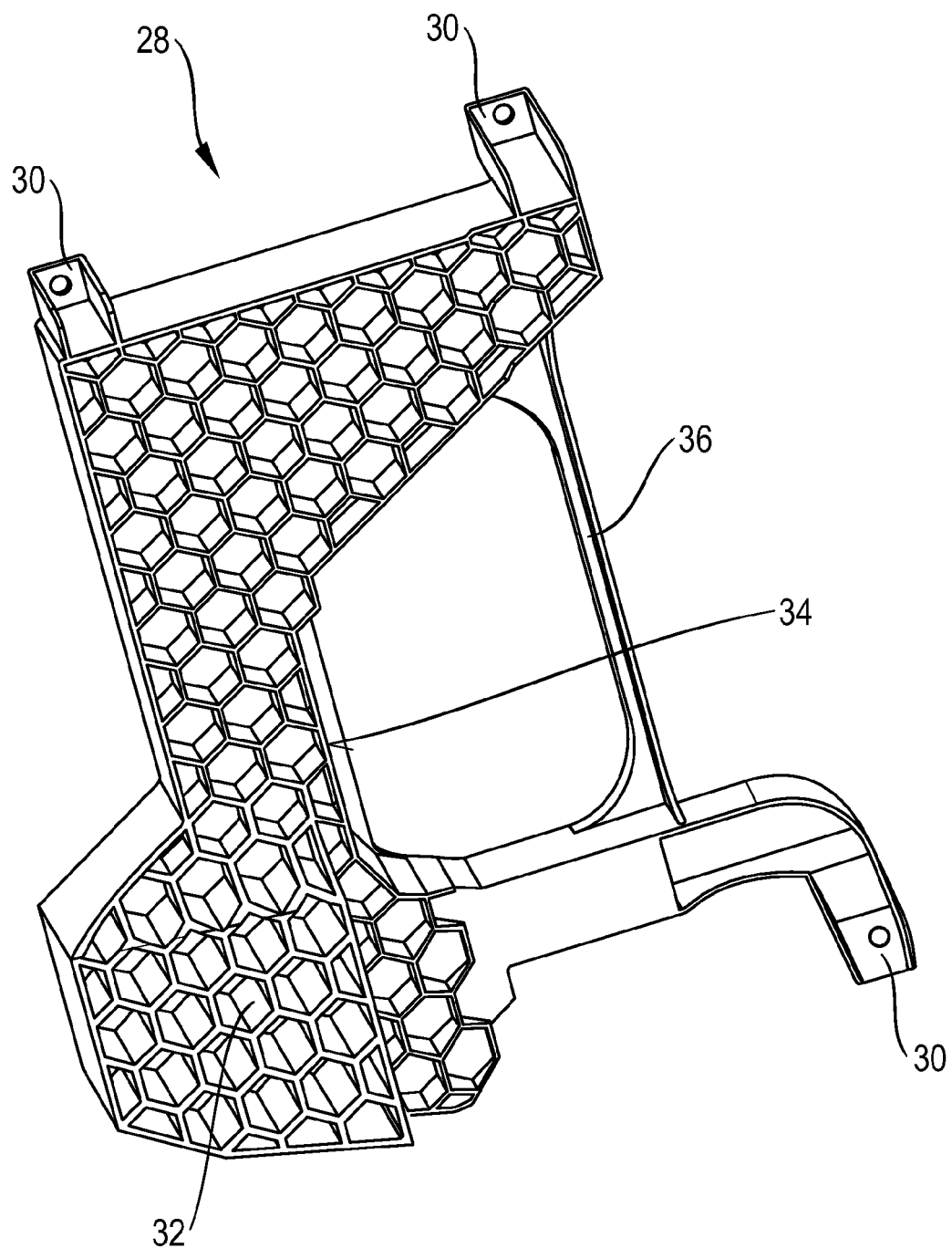
FIG. 4 shows a diagrammatic perspective view of a second embodiment of a crash structure according to the invention for an improvement of the front vehicle part from FIG. 1.

As shown in FIG. 4 using the example of a crash structure 28 which is provided on the right-hand side of the front vehicle part 10, it is also possible to stabilize and to connect to one another the projecting parts of the crash structure 28 which form the cutout 34 via a strut 36.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A front end module for covering a front of a front vehicle part of a motor vehicle, the front end module comprising:
   a crossmember that is connectable to longitudinal carriers of a motor vehicle frame so as to absorb loads of a bumper,
   an upper frame element which is connected to the crossmember for supporting an engine hood, a receiving region for receiving a radiator grill being disposed between the crossmember and the upper frame element,
   fastening elements disposed on at least one of the crossmember or the upper frame element and configured to fasten an intercooler for cooling charge air of a turbocharger in front of, with respect to a driving direction, a wheel arch that receives a front wheel, and a crash structure which is connected to the fastening elements for absorbing impact energy by way of plastic deformation, the crash structure covering a majority of the front wheel arranged in the wheel arch in an installed state of the front end module, wherein the crash structure has a cutout which points toward a vehicle center line and is configured to receive the intercooler or a different intercooler for cooling the charge air of the turbocharger.

2. The front end module as claimed in claim 1, wherein the crash structure has a load-bearing element which is configured as a load-bearing frame for fastening a motor vehicle assembly including at least one of a filter, a pump or a container in a load-bearing manner.

3. The front end module as claimed in claim 1, wherein, in the installed state of the front end module, the crash structure is arranged completely in a direction laterally away from a vehicle center line to an adjacent longitudinal carrier of the motor vehicle frame so as to be arranged in a region which lies laterally outside a load-bearing frame of the motor vehicle.

4. The front end module as claimed in claim 1, wherein the crash structure has at least one of a honeycomb structure, a foam structure or crash boxes.

5. The front end module as claimed in claim 1, wherein, in a part region which points away from a vehicle center line, the crash structure has a greater thickness in the driving direction than outside the part region, and wherein a ratio of a maximum thickness $d_{max}$ of the part region to a thickness $d_m$ of the crash structure which is averaged over a surface region of the crash structure which points in the driving direction is $1.1 \leq d_{max}/d_m \leq 4.0$.

6. The front end module as claimed in claim 1, wherein the crash structure has at least one mounting device for fastening to a body of the motor vehicle and at least one of the crossmember or to the upper frame element.

7. The front end module as claimed in claim 1, wherein the crash structure is configured to initiate a steering movement of a front axle of the vehicle in a first impact phase.

8. The front end module as claimed in claim 1, wherein the crash structure has a honeycomb structure, and wherein at least part of the honeycombs of the honeycomb structure are oriented obliquely with respect to the driving direction.

9. A front vehicle part for a motor vehicle, comprising:
a left-hand longitudinal carrier which forms part of a motor vehicle frame,
a right-hand longitudinal carrier which forms part of the motor vehicle frame,
a left-hand wheel arch which forms part of a motor vehicle body,
a left-hand front wheel which is arranged in the left-hand wheel arch,
a right-hand wheel arch which forms part of the motor vehicle body,
a right-hand front wheel which is arranged in the right-hand wheel arch, and
a front end module comprising:
a crossmember connected to the longitudinal carriers so as to absorb loads of a bumper,
an upper frame element which is connected to the crossmember for supporting an engine hood, a receiving region for receiving a radiator grill being disposed between the crossmember and the upper frame element, fastening elements disposed on at least one of the crossmember or the upper frame element and configured to fasten an intercooler for cooling charge air of a turbocharger, with respect to a driving direction, in front of at least one of the wheel arches, and at least one crash structure which is connected to the fastening elements for absorbing impact energy by way of plastic deformation, the at least one crash structure being positioned, with respect to the driving direction, in front of at least one of the front wheels so as to cover, in the driving direction, a majority thereof, wherein the at least one crash structure has a cutout which points toward a vehicle center line and is configured to receive the intercooler or a different intercooler for cooling the charge air of the turbocharger.

10. The front vehicle part as claimed in claim 9, wherein the at least one crash structure is fastened directly to at least one of the wheel arches.

11. A front end module for covering a front of a front vehicle part of a motor vehicle, the front end module comprising:
a crossmember that is connectable to longitudinal carriers of a motor vehicle frame so as to absorb loads of a bumper,
an upper frame element which is connected to the crossmember for supporting an engine hood, a receiving region for receiving a radiator grill being disposed between the crossmember and the upper frame element,
fastening elements disposed on at least one of the crossmember or the upper frame element and configured to fasten an intercooler for cooling charge air of a turbocharger in front of, with respect to a driving direction, a wheel arch that receives a front wheel, and
a crash structure which is connected to the fastening elements for absorbing impact energy by way of plastic deformation, the crash structure covering a majority of the front wheel arranged in the wheel arch in an installed state of the front end module,
wherein, in a part region which points away from a vehicle center line, the crash structure has a greater thickness in the driving direction than outside the pan region, and wherein a ratio of a maximum thickness $d_{max}$ of the part region to a thickness $d_m$ of the crash structure which is averaged over a surface region of the crash structure which points in the driving direction is $1.1 \leq d_{max}/d_m \leq 4.0$.

12. The front end module as claimed in claim 11, wherein the crash structure has at least one of a honeycomb structure, a foam structure or crash boxes.

13. The front end module as claimed in claim 11, wherein the crash structure has a honeycomb structure, and wherein at least part of the honeycombs of the honeycomb structure are oriented obliquely with respect to the driving direction.

14. The front end module as claimed in claim 11, wherein the crash structure is configured to initiate a steering movement of a front axle of the vehicle in a first impact phase.

15. The front end module as claimed in claim 11, wherein the crash structure has at least one mounting device for fastening to a body of the motor vehicle and at least one of the crossmember or the upper frame element.

16. The front end module as claimed in claim 11, wherein, in the installed state of the front end module, the crash structure is arranged completely in a direction laterally away from a vehicle center line of the motor vehicle frame so as to be arranged in a region which lies laterally outside a load-bearing frame of the motor vehicle.

17. The front end module as claimed in claim 11, wherein the crash structure has a load-bearing element which is configured as a load-bearing frame for fastening a motor vehicle assembly including at least one of a filter, a pump or a container in a load-bearing manner.

\* \* \* \* \*